(12) United States Patent
Burmeister et al.

(10) Patent No.: US 12,088,163 B2
(45) Date of Patent: Sep. 10, 2024

(54) STATOR FOR AN ELECTRIC MACHINE

(71) Applicant: Bayerische Motoren Werke Aktiengesellschaft, Munich (DE)

(72) Inventors: Uwe Burmeister, Munich (DE); Thorsten Rienecker, Munich (DE); Philipp Schlag, Munich (DE); Daniel Winkle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 648 days.

(21) Appl. No.: 17/269,657

(22) PCT Filed: Jul. 23, 2019

(86) PCT No.: PCT/EP2019/069816
§ 371 (c)(1),
(2) Date: Feb. 19, 2021

(87) PCT Pub. No.: WO2020/038680
PCT Pub. Date: Feb. 27, 2020

(65) Prior Publication Data
US 2021/0184530 A1 Jun. 17, 2021

(30) Foreign Application Priority Data
Aug. 21, 2018 (DE) .............. 10 2018 214 081.2

(51) Int. Cl.
*H02K 15/10* (2006.01)
*H02K 3/38* (2006.01)
(Continued)

(52) U.S. Cl.
CPC .............. *H02K 3/38* (2013.01); *H02K 3/505* (2013.01); *H02K 15/105* (2013.01); *H02K 15/12* (2013.01)

(58) Field of Classification Search
CPC .. H02K 3/46; H02K 3/50; H02K 3/52; H02K 3/522; H02K 3/521; H02K 3/524
See application file for complete search history.

(56) References Cited

U.S. PATENT DOCUMENTS 2,747,118 A 5/1956 Coggeshall et al.
3,919,572 A 11/1975 Desy
(Continued)

FOREIGN PATENT DOCUMENTS

AT 364 413 B 10/1981
CN 107210639 A 9/2017
(Continued)

OTHER PUBLICATIONS

English translation of Chinese Office Action issued in Chinese Application No. 201980043002 dated Feb. 11, 2023 (nine (9) pages).
(Continued)

*Primary Examiner* — Bryan R Perez
(74) *Attorney, Agent, or Firm* — Crowell & Moring LLP

(57) ABSTRACT

A stator for an electric machine, including a shaped rod winding, wherein the shaped rod winding is formed by a plurality of shaped rods which have connecting points in the region of a winding head, wherein the connection points are surrounded by a casting layer, and wherein a thickness of the casting layer is predetermined by an enveloping element which is arranged on the winding head close to the contour.

8 Claims, 1 Drawing Sheet

(51) Int. Cl.
*H02K 3/50* (2006.01)
*H02K 15/12* (2006.01)

(56) References Cited

U.S. PATENT DOCUMENTS

| | | | |
|---|---|---|---|
| 4,283,840 A | | 8/1981 | Merikallio et al. |
| 2012/0091840 A1* | | 4/2012 | Nakanishi ............ H02K 3/522 310/71 |
| 2016/0276887 A1* | | 9/2016 | Watanabe ............ H02K 15/064 |
| 2018/0323685 A1 | | 11/2018 | Blum et al. |

FOREIGN PATENT DOCUMENTS

| | | |
|---|---|---|
| DE | 1 015 914 B | 9/1957 |
| DE | 23 33 241 A1 | 1/1975 |
| DE | 24 08 782 A1 | 8/1975 |
| DE | 196 05 470 A1 | 8/1996 |
| FR | 2 734 960 A1 | 12/1996 |
| GB | 1 467 164 A | 3/1977 |
| JP | 55-117447 A | 9/1980 |
| JP | 57-126251 A | 8/1982 |
| JP | 57-134913 A | 8/1982 |
| JP | 58-3552 A | 1/1983 |
| JP | 58-172948 A | 10/1983 |
| JP | 58-224546 A | 12/1983 |
| JP | 59-129556 A | 7/1984 |
| JP | 2002-272047 A | 9/2002 |
| JP | 2005-20842 A | 1/2005 |
| JP | 2016-134991 A | 7/2016 |
| WO | WO 2017/121520 A1 | 7/2017 |
| WO | WO 2018/091295 A1 | 5/2018 |

OTHER PUBLICATIONS

International Search Report (PCT/ISA/210) issued in PCT Application No. PCT/EP2019/069816 dated Aug. 30, 2019 with English translation (six (6) pages).

German-language Written Opinion (PCT/ISA/237) issued in PCT Application No. PCT/EP2019/069816 dated Aug. 30, 2019 (five (5) pages).

German-language Search Report issued in German Application No. 10 2018 214 081.2 dated Mar. 27, 2019 with partial English translation (12 pages).

* cited by examiner

STATOR FOR AN ELECTRIC MACHINE

BACKGROUND AND SUMMARY OF THE INVENTION

The present invention relates to a stator for an electric machine, an enveloping element for a stator and a method for producing a coil.

The electrical conductors for producing the windings of, for example, stators of electric motors are usually produced by enameled wire. The enamel is in this case used for electrical insulation. For connecting the individual conductors, this insulation is stripped off at the corresponding contact points. Once the connection has been produced (for example by welding, soldering or (hot-)crimping etc.), the joint needs to be provided with insulation again. This can take place, for example, by powder coating or encapsulation with a casting resin. In the case of encapsulation with the resin, the stator is positioned, for example, in an apparatus. Then, the casting resin is introduced into the apparatus. Once the resin has cured, the apparatus is removed again. One disadvantage with this is that such casting molds wear, contaminate and need to be cleaned or even replaced from time to time.

One object of the present invention therefore is specifying a stator, an enveloping element and a method for producing a coil which enable effective, quick and inexpensive insulation of stators or coils.

This object is achieved by a stator, an enveloping element and a method according to the independent claims. Further advantages and features can be gleaned from the dependent claims and the description and the attached figures.

In accordance with the invention, a stator for an electric machine comprises a shaped bar winding, wherein the shaped bar winding is formed by a multiplicity of shaped bars which have connection or contact points in the region of an end winding, wherein at least the connection or contact points are enveloped by a casting layer, and wherein a thickness of the casting layer is predetermined by an enveloping element, which is arranged on or fastened to the end winding close to the contour. In this case, the expression "close to the contour" should in particular be understood to mean that a shape of the enveloping element follows a shape of the corresponding end winding as far as possible, as a result of which, in particular, a casting layer with a thickness which is as uniform as possible or a casting layer with a substantially constant thickness or wall thickness is produced. The enveloping element is in this case arranged directly, in other words immediately, on the end winding or else indirectly, in particular via the casting layer, on the end winding. In the case of the shaped bar or else hairpin technology, a corresponding shaped wire is bent in two or three dimensions to form a hairpin and introduced into a stator laminate stack of the stator. The actual end winding is then shaped by transposing of the hairpins. For this purpose, the ends of the hairpins are oppositely transposed, for example, in accordance with the desired wiring diagram, cut to the correct length and then welded, wherein the above-mentioned connection points are produced, with the result that a coil running through the stator is produced.

Expediently, the enveloping element comprises an end section, which is oriented substantially transversely with respect to a longitudinal axis of the stator or a stator core, cf. the abovementioned laminate stack, as well as an inner and an outer enveloping section, which extend along the longitudinal axis. The inner enveloping section and the outer enveloping section are arranged radially with respect to one another in relation to the longitudinal axis and, together with the end section, form an arrangement space or an "envelope" for the end winding. Preferably, the end section and the two enveloping sections are closed, i.e. do not have any openings or the like, which is associated with some advantages, inter alia in respect of the production costs.

Preferably, the enveloping element is connected, at least in regions, to the at least one end winding via the casting layer. Expediently, the enveloping element is fastened, at least in regions, to the end winding via the casting layer. In this case, it is particularly advantageous that, owing to the close-to-the-contour shape of the enveloping element, a thin, but also uniform, casting layer is made possible, which primarily is also light. Preferably, the casting layer is formed over the entire area between the enveloping element and the end winding.

In accordance with one embodiment, the enveloping element has pockets and/or undercuts or forms pockets and/or undercuts. This makes it possible for the enveloping element to be able to follow a geometry or an outer contour of the end winding, i.e., advantageously close to the contour. In other words, the enveloping element, as already mentioned, is matched to the shape of the end winding or follows the shape of the end winding. As a result, it is also achieved in particular that a casting material or in particular a casting resin is used in a sparing manner with respect to resources. For this purpose, the enveloping element can also have, in addition to the pockets or outward bulges, inward bulges or generally projections and/or recesses. Typical casting layer thicknesses are in this case, for example, in a range of from approximately 1 to 5 mm. In this case, however, it is also unproblematic if a thickness of the casting layer is "zero", so to speak, i.e., if the conductor elements, in particular the shaped bars, rest directly against the enveloping element. In this case, the insulation is provided directly by the enveloping element. As a result of the fact that the enveloping element remains on the end winding, this is unproblematic, however.

In accordance with one embodiment, the enveloping element is designed to be flexible, at least in regions. In this case, the enveloping element develops its final rigidity only once the casting layer has cured. This may be advantageous in respect of the production of the enveloping element since shape and position tolerances may possibly be larger. Alternatively, the enveloping element is a solid shape, however, which can be pushed onto the end winding. Preferably, the enveloping element is formed from a plastic, in particular a plastic which itself has good electrical insulation properties.

In accordance with one embodiment, the enveloping element is designed in such a way that it is also fastened in a force-fitting manner to the end winding. In this case, the enveloping element is fastened to the end winding not exclusively via the casting compound. This may be advantageous in respect of installation since the enveloping element so to speak also "holds" on the corresponding end winding although no casting compound or no casting resin has yet been arranged, for example injected.

The invention is also directed at an enveloping element for a stator according to the invention.

Furthermore, the invention is directed at a method for producing a coil, in particular for producing or insulating a stator of an electric machine, including the following steps:
  providing a coil, which has at least one end winding;
  using an enveloping element for shaping a casting layer on the at least one end winding.

At this juncture, mention will be made of the fact that the advantages mentioned in connection with the stator apply similarly and correspondingly to the method and to the enveloping element, and vice versa and between themselves.

In accordance with one embodiment, the method includes the following steps:
- introducing casting compound into the enveloping element prior to attaching the enveloping element to the at least one end winding;
- dipping the at least one end winding into the enveloping element.

The enveloping element is filled with (casting) resin, for example. Then, the coil, in particular a stator of an electric machine, is dipped with the end winding to be cast into the resin. Then, the resin can cure, and the enveloping element remains on the stator.

In accordance with one embodiment, the method includes the following steps:
- arranging the enveloping element on the at least one end winding;
- introducing casting compound between the enveloping element and the at least one end winding.

In this case, the enveloping element is therefore first positioned on the stator and then filled with (casting) resin. Expediently, the enveloping element does not have any fill openings or the like for the resin. Instead, in accordance with one embodiment, the resin is advantageously introduced into a gap which is provided in any case between the end winding and the enveloping element.

The possibility of filling the casting cap at different times or in different ways is a considerable advantage in terms of production. The enveloping element itself can in both cases have the same configuration.

The use of the enveloping element, which remains on the coil or on the stator even after the casting, markedly increases the stability of the stator, in particular the mechanical stability, for example in the case of oscillations, in particular also in comparison with a powder coating. Preferably, the stator is a stator of an electric machine of a motor vehicle, in particular an electric vehicle or hybrid vehicle. It is also advantageous that, in contrast to the case of a conventional injection mold, undercuts or the like can also be produced without any problems, as a result of which optimum matching of a shape of the enveloping element to a shape of the end winding is possible. In addition, cleaning of the injection-molding die, maintenance thereof etc. is no longer required, with the result that the proposed solution is also interesting in terms of costs.

Further advantages and features can be gleaned from the description below of embodiments of a stator and an enveloping element with reference to the attached figures. Various features can in this case be combined with one another within the scope of the invention.

DETAILED DESCRIPTION OF THE DRAWINGS

Figure 1:
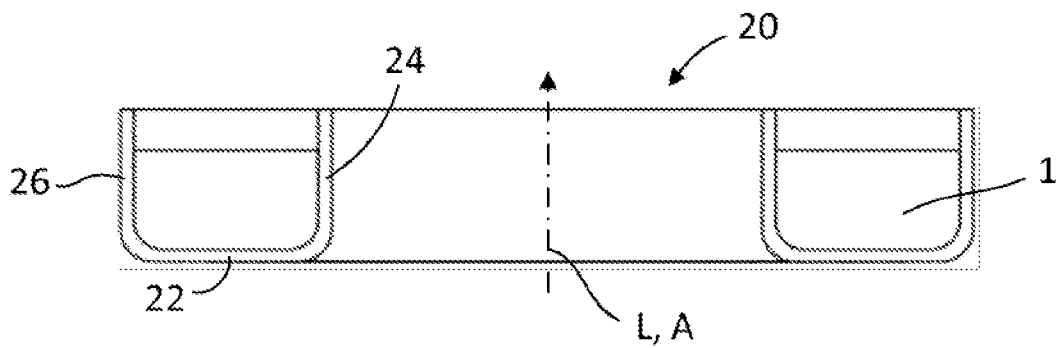
FIG. 1 shows a section through an embodiment of an enveloping element in a schematic illustration.

FIG. 1 shows a sectional illustration of an enveloping element 20, which has an approximately circular end section 22, from which an inner enveloping section 24 and an outer enveloping section 26 extend along a longitudinal axis L. The longitudinal axis L runs parallel to or on a stator axis (not illustrated further here). The reference symbol 1 denotes a casting compound with which the enveloping element 20 has been filled. Thus, for example, a stator can be dipped with its end winding into an enveloping element 20 which has been prepared in this way. Once the casting compound 1, for example the casting resin, has cured, the enveloping element 20 then remains on the stator or on the end winding. Reference symbol A also illustrates an arrangement direction. In particular, this is intended to mean a direction along which the enveloping element 20 can be pushed onto an end winding. As has already been mentioned, however, it is also possible for the end winding to be moved into the enveloping element 20 in the opposite direction to this arrangement direction A.

Figure 2:
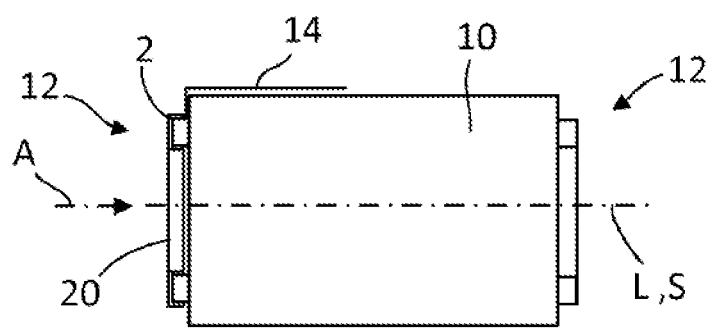
FIG. 2 shows a side view of a stator with an enveloping element arranged thereon in a schematic view.

FIG. 2 shows a schematic view of a stator 10, which has an end winding 12 at each end. The stator extends along a longitudinal axis L or along a stator axis S. The stator 10 illustrated here has, for example, a shaped bar winding, wherein the shaped bars or hairpins have been pushed into a stator core from the right-hand side. In the left-hand part, the shaped bars are then transposed or else interconnected to form the end winding 12 illustrated there. In this region, which is illustrated as a section, an enveloping element 20 is now pushed onto the end winding 12 along the arrangement direction A, with the result that, after the casting, a casting layer 2 has been formed around the end winding 12. It can be seen at least schematically that a shape of the enveloping element 20, in particular the arrangement space thereof, which is formed by the end section and the inner and the outer enveloping section, cf. in this regard also FIG. 1, follows a shape of the end winding 12. In the region of the end winding 12, a phase terminal 14 is furthermore also provided, which is used for making electrical contact with the stator 10.

Figure 3:
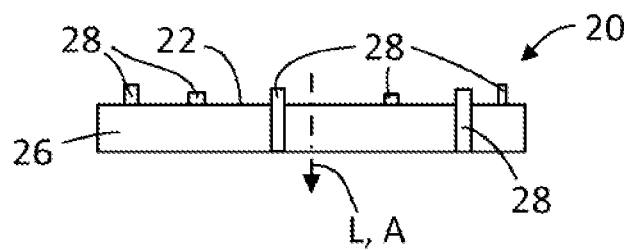
FIG. 3 shows a further schematic view of an embodiment of an enveloping element.

FIG. 3 shows, in a further schematic illustration, an enveloping element 20, wherein it can be seen in the embodiment shown here that the enveloping element 20 can have pockets 28, which extend radially or axially away from an end section 22 or from an outer enveloping section 26.

Figure 4:
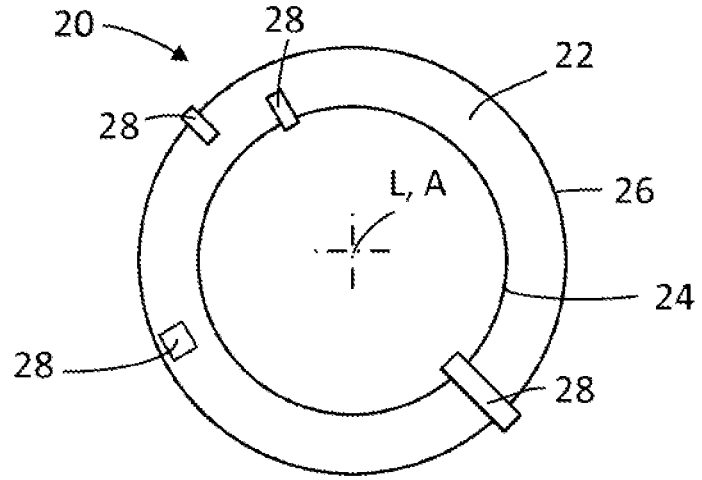
FIG. 4 shows a plan view of a further schematic view of an embodiment of an enveloping element.

FIG. 4 shows, similarly to FIG. 3, a multiplicity of pockets 28, wherein it can be seen that the pockets 28 extend along a longitudinal axis L or an arrangement direction A. An enveloping element 20 is shown here in a plan view (viewed along the arrangement direction A). The pockets 28 extend radially and axially with respect to the longitudinal axis L of the enveloping element 20. In principle, such pockets serve the purpose of making it possible for the enveloping element to follow, as precisely as possible, a shape or a geometry of the winding head therebeneath. Precisely when the end winding is connected, for example, to a phase terminal assembly, as illustrated in FIG. 2 (reference symbol 14 in this figure), it may arise that some shaped bars practically "protrude" from the end winding. The pockets 28 or else outward bulges, undercuts or the like nevertheless enable a uniform thickness of the casting layer.

LIST OF REFERENCE SYMBOLS 1 casting compound
2 casting layer
10 coil, stator
12 end winding
14 phase terminal
20 enveloping element 22 end section
24 inner enveloping section
26 outer enveloping section
28 pocket
L longitudinal axis
S stator axis
A arrangement direction

What is claimed is:

1. A stator for an electric machine, comprising:
a shaped bar winding,
wherein the shaped bar winding is formed by a multiplicity of shaped bars which have connection points in the region of an end winding,
wherein the connection points are enveloped by a casting layer,
wherein a thickness of the casting layer is predetermined by an enveloping element, which is arranged on a contour of the end winding, and
wherein the enveloping element includes a plurality of protrusions that extend radially toward and away from a longitudinal axis of the enveloping element from an innermost circumferential surface and an outermost circumferential surface of the enveloping element, respectively, and extend axially away from an end surface of the enveloping element at an outer end of the stator in parallel to the longitudinal axis.

2. The stator according to claim 1, wherein the enveloping element is connected to the end winding via the casting layer.

3. The stator according to claim 1, wherein the enveloping element is flexible, at least in regions.

4. The stator according to claim 1, wherein the enveloping element is fastened in a force-fitting manner to the end winding.

5. An enveloping element for the stator according to claim 1.

6. A method for producing a coil, comprising:
providing a coil, which has at least one end winding; and
using an enveloping element for shaping a casting layer on the at least one end winding,
wherein the enveloping element includes a plurality of protrusions that extend radially toward and away from a longitudinal axis of the enveloping element from an innermost circumferential surface and an outermost circumferential surface of the enveloping element, respectively, and extend axially away from an end surface of the enveloping element at an outer end of the stator in parallel to the longitudinal axis.

7. The method according to claim 6, further comprising:
introducing a casting compound into the enveloping element prior to attaching the enveloping element to the at least one end winding; and
dipping the at least one end winding into the enveloping element.

8. The method according to claim 6, further comprising:
arranging the enveloping element on the at least one end winding; and
introducing casting compound between the enveloping element and the at least one end winding.

* * * * *